April 18, 1933.   L. MYERS   1,903,791
ICE CREAM LADLE
Filed April 2, 1932   2 Sheets-Sheet 1

Inventor:
Louis Myers,
By Lynforth, Lee, Christian & Wiles,
Attys.

April 18, 1933.    L. MYERS    1,903,791
ICE CREAM LADLE
Filed April 2, 1932    2 Sheets-Sheet 2
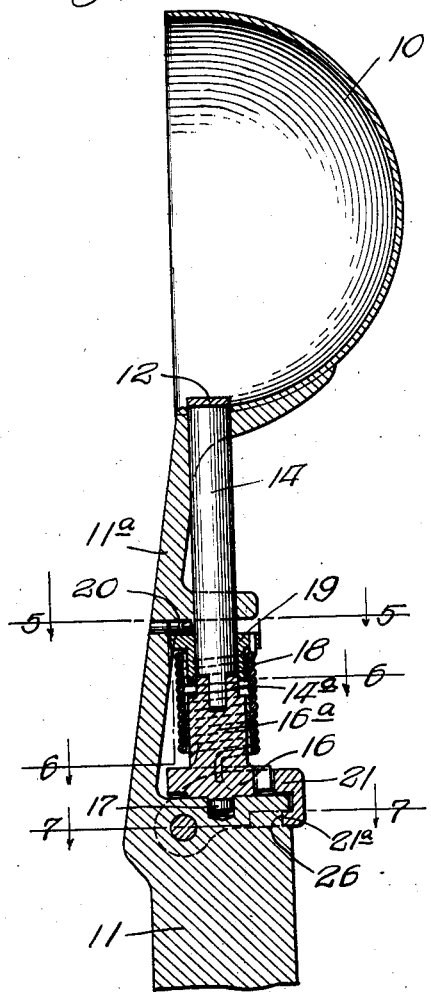
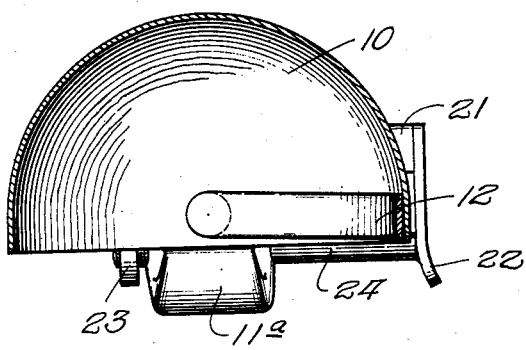
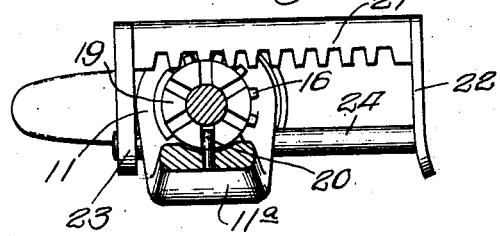
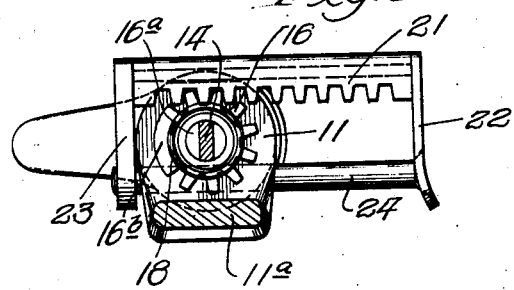
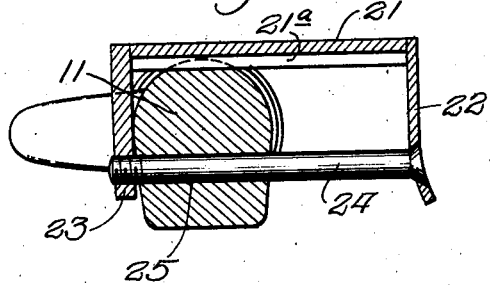
Inventor:
Louis Myers, Patented Apr. 18, 1933

1,903,791

UNITED STATES PATENT OFFICE

LOUIS MYERS, OF CHICAGO, ILLINOIS

ICE CREAM LADLE

Application filed April 2, 1932. Serial No. 602,799.

This invention relates to improvements in ladles and, more especially, a self-emptying ladle of the type commonly used in dispensing ice-creams and similar semi-solid materials.

Among the features of my invention is the provision of such a ladle that can be easily and cheaply manufactured and one which is simple and efficient in construction and operation.

Another feature of my invention is the provision of a ladle that can readily be assembled and disassembled, thus facilitating cleaning and repairing.

Another feature of my invention is the provision of a ladle with a spring return for the scraper, the tension of which can be easily adjusted.

Another feature of my invention is the provision of a ladle in which most of the moving parts are hidden from view, thus enhancing the appearance of the article.

Other features and advantages of my invention will appear more fully as I proceed with my specification.

In that form of device embodying the features of my invention shown in the accompanying drawings—

Figure 1:
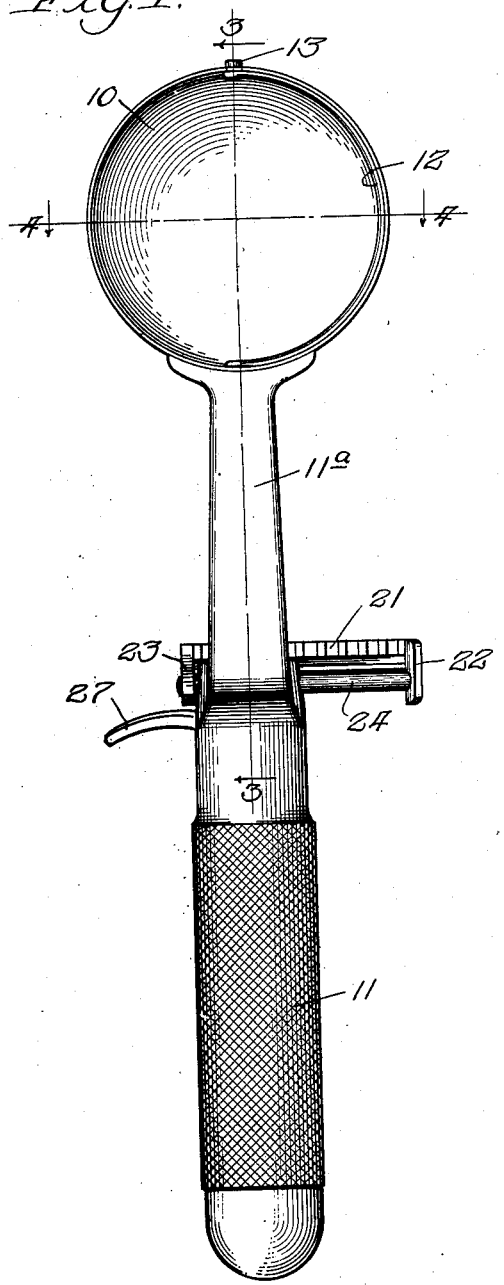
Figure 2:
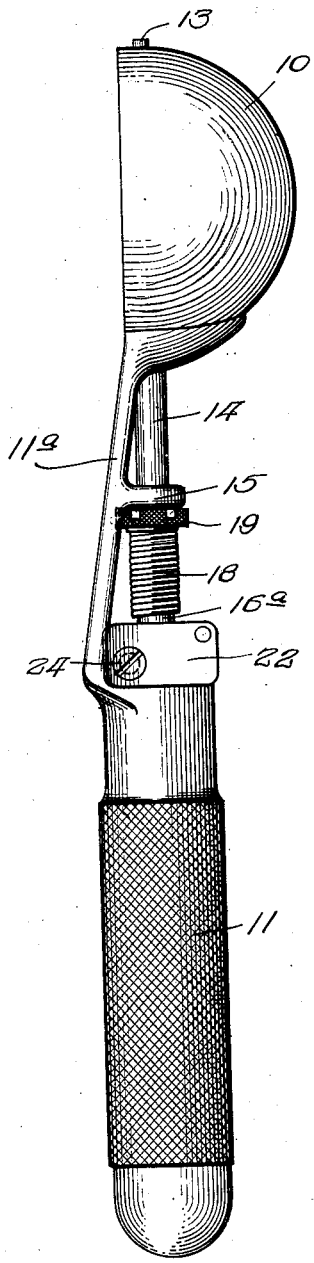

Figure 1 is a top plan view; Fig. 2 is a view in side elevation; Fig. 3 is a view taken as indicated by the line 3 of Fig. 1; Fig. 4 is a view taken as indicated by the line 4 of Fig. 1; Fig. 5 is a view taken as indicated by the line 5 of Fig. 3; Fig. 6 is a view taken as indicated by the line 6 of Fig. 3; and Fig. 7 is a view taken as indicated by the line 7 of Fig. 3.

As shown in the drawings, the ladle includes a hemispherical bowl 10 with a handle. The handle is here shown as made in one piece and includes the cylindrical part 11 and the flattened bar or bridging member 11ª joining the cylindrical part 11 to the bowl 10.

Swingably mounted in the bowl 10 is a scraper 12. This mounting is accomplished by providing the outer end of the scraper with a pivot or trunnion 13 extending through a hole in the bowl near its rim. The other end of the scraper 12 is attached to a scraper-operating shaft 14 (likewise extending through a hole in the bowl near its margin) rotatably mounted on the handle under the bridging member 11ª.

15 indicates a bearing or eye on the underside of the bridging member 11ª which supports the inner end of the scraper- operating shaft 14. 16 indicates a gear with a pivot or trunnion 17 rotatably mounted in a socket in the end of the handle portion 11. The gear 16 is provided with an elongated hub 16ª having a rectangular socket embracing the flattened projection 14ª on the end of the scraper-operating shaft. 18 indicates a spiral spring surrounding the hub 16ª of the gear and also the extreme end of the shaft 14. 19 indicates a castellated spring adjusting nut held in its adjusted positions by the depending pin 20 in the bridging member 11ª. One end of the spring is retained in the adjusting nut 19 and the other end in the gear 16. The nut may be moved toward the handle portion 11 against the compression of the spring 18 to disengage it from the pin 20, whereupon it may be turned to give the spring the desired adjustment and it may then again be engaged with the pin. A portion of the gear 16 may be mutilated, as indicated by 16ᵇ, to limit rotation thereof.

Means are provided for operating the scraper 12. Such means includes a transversely arranged reciprocable rack bar 21 carried by the handle and engaging the gear. The rack bar 21 is slidably mounted on the handle in the following manner. The ends of the bar are provided with arms 22 and 23, the ends of which are connected by a removable screw 24 extending through an elongated hole 25 in the handle-portion 11. The rack bar is also provided with a flange 21ª operating in a groove or slide 26 in the handle 11.

27 indicates a claw or spur on the handle between the portions 11 and 11ª adapted to be engaged by the first finger of the hand of an operator to aid in forcing the ladle into the substance to be served.

The ladle may be easily disassembled in the following manner. The screw 24 may be removed to free the rack bar. The trunnion 13 on the scraper may then be snapped out of its socket and the scraper with the shaft 14 removed. This will free the gear 16, spring 18 and adjusting nut 19.

While I have shown and described certain embodiments of my invention, it is to be understood that it is capable of many modifications. Changes, therefore, in the construction and arrangement may be made without departing from the spirit and scope of the invention as disclosed in the appended claims, in which it is may intention to claim all novelty inherent in my invention as broadly as permissible, in view of the prior art.

What I regard as new, and desire to secure by Letters Patent, is:

1. A ladle, including; a bowl; a handle attached to the bowl, including a cylindrical portion and a flattened bridging member; a bearing on the underside of the bridging member; a scraper swingably mounted in the bowl; a scraper-operating shaft rotatably mounted on the handle and extending through the bearing on the underside of the bridging member; a gear on said shaft; a spiral spring surrounding said shaft with one end attached to said gear; a spring tension adjusting nut on said shaft adjacent the bearing on the bridging member, said nut being attached to the other end of said spring; means for retaining the spring tension adjusting nut in its adjusted position; and a transversely arranged reciprocable rack bar carried by the handle and engaging said gear.

2. A ladle, including; a bowl; a handle attached to the bowl, including a cylindrical portion and a flattened bridging member; a bearing on the underside of the bridging member; a scraper swingably mounted in the bowl; a scraper-operating shaft rotatably mounted on the handle and extending through the bearing on the underside of the bridging member; a gear rotatably mounted on the handle with a socket, the end of the scraper-operating shaft being non-rotatably and detachably mounted in said socket; a spiral spring surrounding said shaft with one end attached to said gear; a spring tension adjusting nut on said shaft adjacent the bearing on the bridging member, said nut being attached to the other end of said spring; means for retaining the spring tension adjusting nut in its adjusted position; and a transversely arranged reciprocable rack bar carried by the handle and engaging said gear.

3. A ladle, including; a bowl; a handle attached to the bowl, said handle being provided with a transverse hole and a transverse groove; a scraper swingably mounted in the bowl; a scraper-operating shaft rotatably mounted on the handle; a gear on said shaft; a transversely arranged reciprocable rack bar carried by the handle and engaging said gear, said rack bar being provided with two arms connected by a pin slidably mounted in the hole in the handle, and said rack bar being provided with a flange slidably mounted in the groove in the handle; and spring means urging the scraper to its normal position.

4. A ladle, including; a bowl; a handle attached to the bowl, said handle being provided with a transverse hole; a scraper swingably mounted in the bowl; a scraper-operating shaft rotatably mounted on the handle; a gear on said shaft; a transversely arranged reciprocable rack bar carried by the handle and engaging said gear, said rack bar carrying a removable pin slidably mounted in the hole in the handle; and spring means urging the scraper to its normal position.

5. A ladle, including; a bowl; a handle attached to the bowl, said handle being provided with a transverse hole; a scraper swingably mounted in the bowl; a scraper-operating shaft rotatably mounted on the handle; a gear on said shaft; a transversely arranged reciprocable rack bar carried by the handle and engaging said gear, said rack bar carrying two arms connected by a removable pin slidably mounted in the hole in the handle; and spring means urging the scraper to its normal position.

In witness whereof, I have hereunto set my hand this 31st day of March, 1932.

LOUIS MYERS.